United States Patent
Rokhsaz et al.

(10) Patent No.: US 7,924,912 B1
(45) Date of Patent: *Apr. 12, 2011

(54) METHOD AND APPARATUS FOR A UNIFIED SIGNALING DECISION FEEDBACK EQUALIZER

(75) Inventors: Shahriar Rokhsaz, Austin, TX (US); Michael A. Nix, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 1197 days.

This patent is subject to a terminal disclaimer.

(21) Appl. No.: 11/591,977

(22) Filed: Nov. 1, 2006

(51) Int. Cl.
*H03H 7/30* (2006.01)
*H03H 7/40* (2006.01)
*H03K 5/159* (2006.01)

(52) U.S. Cl. .................. 375/233; 375/229; 375/316

(58) Field of Classification Search .......... 375/223, 375/316, 229–236; 708/300–323, 819; 333/28
See application file for complete search history.

(56) References Cited

U.S. PATENT DOCUMENTS

| | | | |
|---|---|---|---|
| 6,292,912 B1 * | 9/2001 | Cloke et al. ............ | 714/718 |
| 7,254,343 B2 * | 8/2007 | Gu et al. ............ | 398/164 |
| 7,697,603 B1 * | 4/2010 | Wang et al. ............ | 375/233 |
| 2006/0256892 A1 * | 11/2006 | Momtaz ............ | 375/317 |
| 2006/0291552 A1 * | 12/2006 | Yeung et al. ............ | 375/233 |

OTHER PUBLICATIONS

Xilinx, Inc.; U.S. Appl. No. 11/299,975 by Rokhsaz filed Dec. 12, 2005.
U.S. Appl. No. 11/299,975, filed Dec. 12, 2005, Rokhsaz, Shahriar Xilinx, Inc., 2100 Logic Drive, San Jose, CA.

* cited by examiner

*Primary Examiner* — Mohammad H Ghayour
*Assistant Examiner* — Sophia Vlahos
(74) *Attorney, Agent, or Firm* — Michael T. Wallace; John J. King (57) ABSTRACT

A method and apparatus for advantageously utilizing the reset state of an RTZ shift register to guarantee proper data alignment at the feedback taps to facilitate decision feedback equalization (DFE) in a unified signaling system. An input data stream is sliced into an even data stream and an odd data stream, whereby the sliced data is compared to a programmable threshold depending upon a detection mode. Each bit of the even data stream is propagated through RTZ latches and each bit of the odd data stream is propagated through RTZ latches. At any given instant in time, a correct portion of the RTZ latch outputs contain zero information, so that each latch output may be summed in a current mode without the need for any intervening logic. The input data stream is summed in current mode with the feedback data and converted to voltage prior to sampling the currently received data bit.

18 Claims, 8 Drawing Sheets

METHOD AND APPARATUS FOR A UNIFIED SIGNALING DECISION FEEDBACK EQUALIZER

FIELD OF THE INVENTION

The present invention generally relates to decision feedback equalizers (DFE), and more particularly to high speed decision feedback equalizers utilized with unified signaling systems.

BACKGROUND

Communication developments in the last decade have demonstrated what seems to be a migration from parallel data input/output (I/O) interface implementations to a preference for serial data I/O interfaces. Some of the motivations for preferring serial I/O over parallel I/O include reduced system costs through reduction in pin count, simplified system designs, and scalability to meet the ever increasing bandwidth requirements of today's communication needs. Serial I/O solutions will most probably be deployed in nearly every electronic product imaginable, including IC-to-IC interfacing, backplane connectivity, and box-to-box communications.

Added to the complexity of adapting today's communication systems to the plethora of communication protocols that are available, is the challenging task of mitigating the channel effects that are imposed upon the transmitted signal, such as intersymbol interference (ISI). Conventional techniques used to mitigate these ISI effects include the use of a decision feedback equalizer (DFE), which utilizes information obtained from previously received data bits to correct the currently received data bit.

In a typical DFE application, for example, a serial data path is sampled by a plurality of master-slave latches, whereby during the first half cycle, data bits are sampled, and during the second half cycle, data bits are stored. The stored data bits are then feedback to various taps of a summing junction, which adds or subtracts a scaled value of the stored data bits to the currently received data bit. As such, ISI caused by previously received data bits may be substantially subtracted from the currently received data bit.

As the data rate increases, however, the cycle time, or unit interval (UI), of each data bit shrinks, effectively decreasing the amount of time that is available to perform the DFE function. In addition, advanced feed-forward equalization (FFE), as utilized by the unified signaling technique, creates an information-rich signal that may be sampled at various points within the UI at the receiver. In particular, FFE techniques utilized by the unified signaling approach, maximizes the eye openings of the received data stream at both the bit center and the bit edge. As such, the DFE function at the receiver should be flexible enough to allow ISI reduction through data sampling at both the data center and data edge eye openings. Efforts continue, therefore, to reduce the delay of the feedback loop and to increase its sampling flexibility, so that proper DFE operation may be sustained despite the ever decreasing UI time allocation in a unified signaling system.

SUMMARY

To overcome limitations in the prior art, and to overcome other limitations that will become apparent upon reading and understanding the present specification, various embodiments of the present invention disclose an apparatus and method for leveraging the reset attributes of a return to zero (RTZ) latch to provide real time updates to the feedback taps of a decision feedback equalizer (DFE). By utilizing the reset attributes of the RTZ latches, all feedback connections may be brought directly to the summing node, with no intervening logic, to facilitate a low delay, fast DFE with inherent parallel to serial conversion of the feedback taps. In addition, flexibility is added to the DFE, such that sampling instances and detection thresholds are made programmable so as to enhance operation of the DFE in a communication system that implements unified signaling.

In accordance with one embodiment of the invention, a method of performing decision feedback equalization (DFE) of a currently received data bit comprises propagating a first portion of input data bits through a first plurality of latches, propagating a second portion of the input data bits through a second plurality of latches, resetting a first group of the first and second plurality of latches during a time period, activating a second group of the first and second plurality of latches during the time period. A portion of the activated latches are adapted to detect multiple levels of the input data bits by comparison to a programmable threshold. The method further comprises combining the outputs of the activated latches during the time period and summing a currently received input data bit with the combined outputs during the time period to equalize the currently received input data bit.

In accordance with another embodiment of the invention, a decision feedback equalizer (DFE) comprises a first shift register that is coupled to receive an input data stream and a first programmable threshold and is coupled to provide a first portion of previously received data bits whose logic values are determined by comparison to the first programmable threshold. A first group of data bits of the first portion are activated and a second group of data bits of the first portion are reset. The DFE further comprises a second shift register that is coupled to receive the input data stream and the first programmable threshold and is coupled to provide a second portion of the previously received data bits whose logic values are determined by comparison to the first programmable threshold. A third group of data bits of the second portion are activated and a fourth group of data bits of the second portion are reset. The DFE further comprises a summation block that is coupled to receive the input data stream and is coupled to the first and second shift registers and is adapted to sum a currently received data bit of the input data stream with the first and second portions of the previously received data bits. The summation block is adapted to combine the activated and the reset groups of data bits to equalize the currently received data bit.

In accordance with another embodiment of the invention, a method of performing decision feedback equalization (DFE) comprises propagating a first portion of input data bits through a first plurality of latches, propagating a second portion of the input data bits through a second plurality of latches, resetting a first group of the first and second plurality of latches during a time period, activating a second group of the first and second plurality of latches during the time period, comparing the input data bits to at least one threshold value to determine a detected output of the activated latches, combining all outputs of the first and second groups of latches during the time period, and summing a currently received input data bit with the combined outputs during the time period to equalize the currently received input data bit.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to decision feedback equalizers (DFEs) that substantially decrease the feedback delay required to remove post-cursor information from the incoming signal. Return to zero (RTZ) latches are utilized to slice an incoming full-rate data stream into two, half-rate data streams. Data bits from a number of series connected RTZ latches in each half-rate data path are then feedback to a summing node, where correction of the present cursor is performed at the full rate using the post-cursor information contained in the feedback signals.

In particular, the set/reset operation of the RTZ latch is advantageously utilized to provide the correct feedback information to the summer for correction of the current cursor at the full rate. That is to say, for example, that the DFE feedback taps are configured to receive data bits from each RTZ latch of each half-rate data path simultaneously. By operation of the RTZ latches, however, half of the feedback data is in a reset, or zero information state, while the other half of the feedback data is in an active state. Accordingly, the correct feedback data is guaranteed to exist at the summing node of the DFE to correct the currently received data bit.

Furthermore, the correction is applied at the full rate, such that DFE operation is accomplished within a single unit interval (UI). In particular, current mode multiplexing is applied at the summing node, whereby each feedback tap is appropriately weighted and steered in current mode to reduce the delay required to subtract the inter-symbol interference (ISI) from each data bit received. Thus, while the feedback taps are updated at half-rate, the DFE nevertheless operates at full-rate through efficient use of the RTZ phase and current steering topology.

Still further, the sampling instances of each RTZ latch is programmable, to optimize sampling of a bit-center equalized and/or a bit-edge equalized signal. As discussed in more detail below, feed-forward equalization (FFE) may be applied to the transmitted signal so that eye openings may be optimized at the bit center, to facilitate non-return-to-zero (NRZ) sampling. Additionally, FFE may be applied to the transmitted signal so that eye openings may also be optimized at the bit edge, to facilitate duobinary (DB) sampling. The RTZ latch, therefore, exhibits programmable detection thresholds to accommodate both NRZ and DB detection modes.

Figure 1:
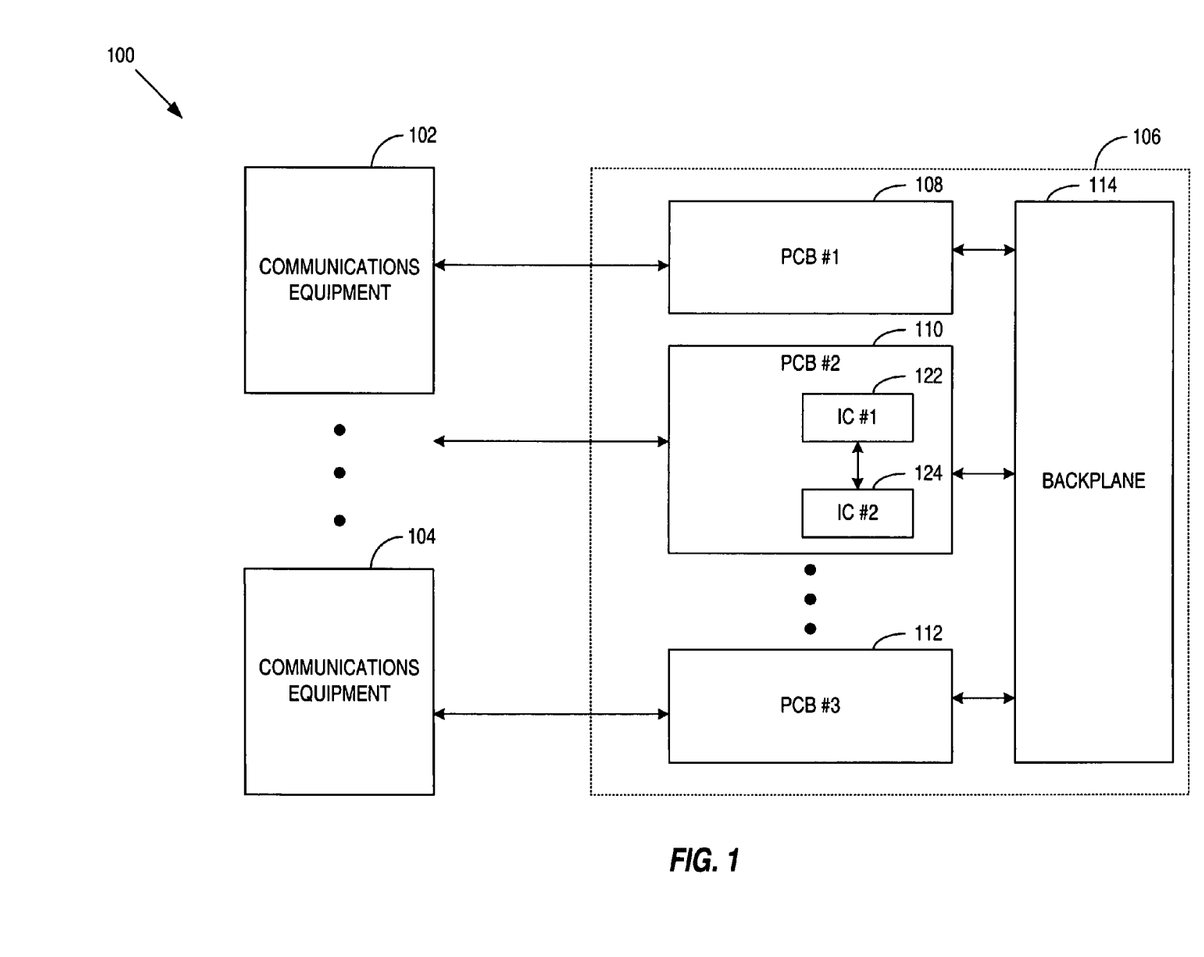
FIG. 1 illustrates an exemplary communication system.

Application of the RTZ latch enabled DFE is virtually unlimited and may be utilized with any communication protocol that requires high speed DFE operation, such as is exemplified by communication system 100 of FIG. 1. Communications equipment blocks 102-106 may represent communicating entities, in which communication takes place at various levels and distances using various wired and/or wireless technologies. Typical communication channels may include signal traces on printed circuit boards (PCBs) composed of glass epoxy, such as G-10 or FR4, impedance controlled transmission lines, optical mediums, or free space.

Communications equipment blocks 102-104, for example, may communicate with communications block 106 via a Local Area Network (LAN) or Storage Network (SN) using technologies such as 1 Gigabit Ethernet, or 10 Gigabit Ethernet, as specified by IEEE 802.3. Alternatively, communication system 100 may represent a data center, a storage network, or a System Area Network (SAN), for example, in which the Infiniband serial I/O interconnect architecture, or Fiber Channel, is utilized. Alternatively, communication system 100 may represent a Synchronous Optical NETwork (SONET) or Synchronous Digital Hierarchy (SDH) employed by many Internet Service Providers (ISPs) and other high bandwidth end users.

Still other communication technologies supported by communication system 100 may include Peripheral Component Interconnect (PCI), PCI-Express, RapidIO, and Serial Advanced Technology Attachment (ATA). Such communication standards may be implemented, for example, to support serial communications between PCBs 108-112, integrated circuits (ICs) 122-124, and backplane 114. In one embodiment, ICs 122-124 may represent programmable logic devices, such as field programmable gate arrays (FPGAs), which may be configured and adapted to provide communication support to the various communication protocols as discussed above.

Figure 2:
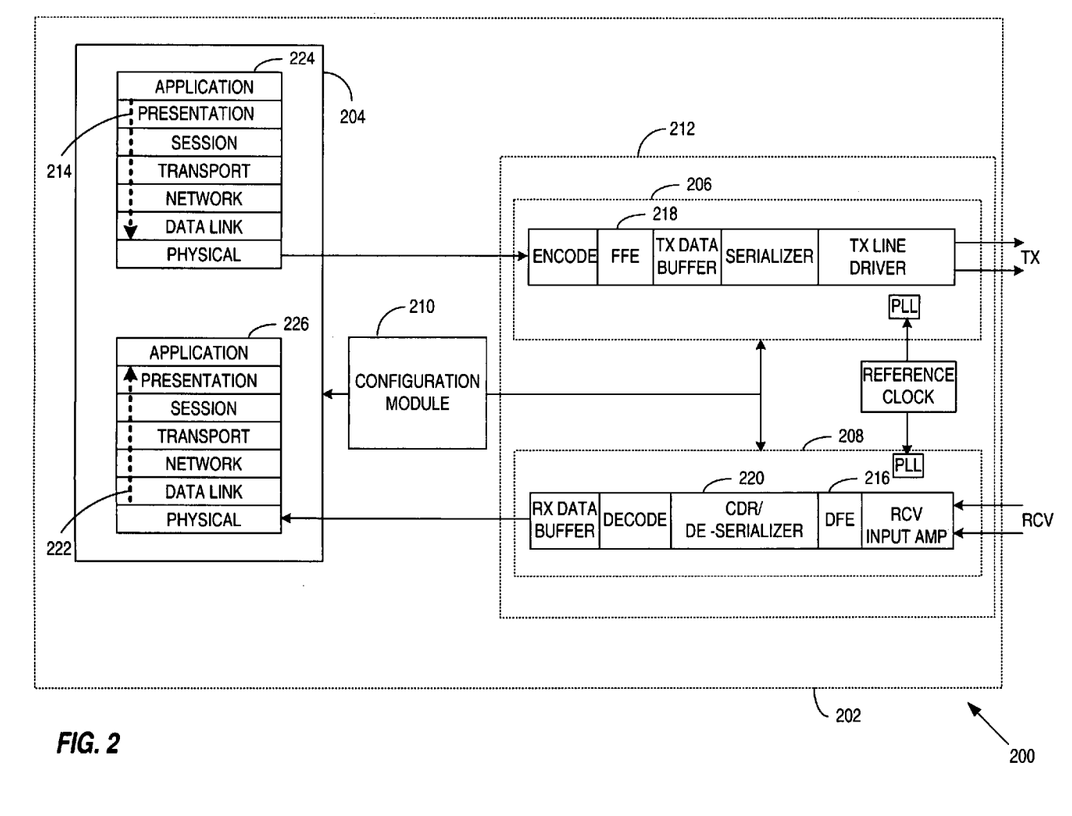
FIG. 2 illustrates an exemplary application of a high speed decision feedback equalizer (DFE)

Turning to FIG. 2, an exemplary block diagram 200 is illustrated in which integrated circuit (IC) 202 conducts serial communications with external communications equipment (not shown). In one embodiment, IC 202 may represent an FPGA, whereby configurable logic portion, e.g., fabric 204, and related processor supported functions are used to implement communication stacks 224 and 226 in support of the various communication protocols discussed above.

Using such an arrangement, data frames outbound from FPGA fabric 204 may propagate from, for example, the application layer to the physical layer of communication stack 224 via communication path 214. Similarly, data frames inbound to FPGA fabric 204 may propagate from, for example, the physical layer to the application layer of communication stack 226 via communication path 222.

Multi-gigabit transceiver (MGT) 212 implements the physical media attachment (PMA) and the physical coding sublayer (PCS) via transmitter 206 and receiver 208, which is part of the physical communication layers of communication stacks 224 and 226. Included with the PMA function, for example, are the serializer/deserializer (SERDES), the transmit line driver, the receiver input amplifier, clock generation and clock and data recovery (CDR) 220 of MGT 212. While two phase locked loops (PLLs) are shown, a single PLL may be used for both transmitter 206 and receiver 208.

FFE 218, as discussed in more detail below, provides bit-centered and bit-edge equalization of the transmitted signal to optimize eye openings of the received data signal for both NRZ and DB detection. DFE 216, as discussed in more detail below, accepts serial data at the full-rate and provides tap information to CDR 220. In addition, DFE 216 provides feedback tap information to a summing node within DFE 216 so that ISI due to previously received bits through a band-limited medium may be substantially removed.

Included with the PCS function, is the encoding/decoding function where, for example, 8B/10B or 64B/66B encoding/decoding is performed. The PCS function may also perform scrambling/descrambling functions and elastic buffering in support of channel bonding and clock correction. In support of the configuration and/or partial reconfiguration of FPGA fabric 204 and MGT 212 is configuration module 210, which may provide an on-board microprocessor, to further enable communication protocol support as well as configuration/ maintenance functionality.

Figure 3:
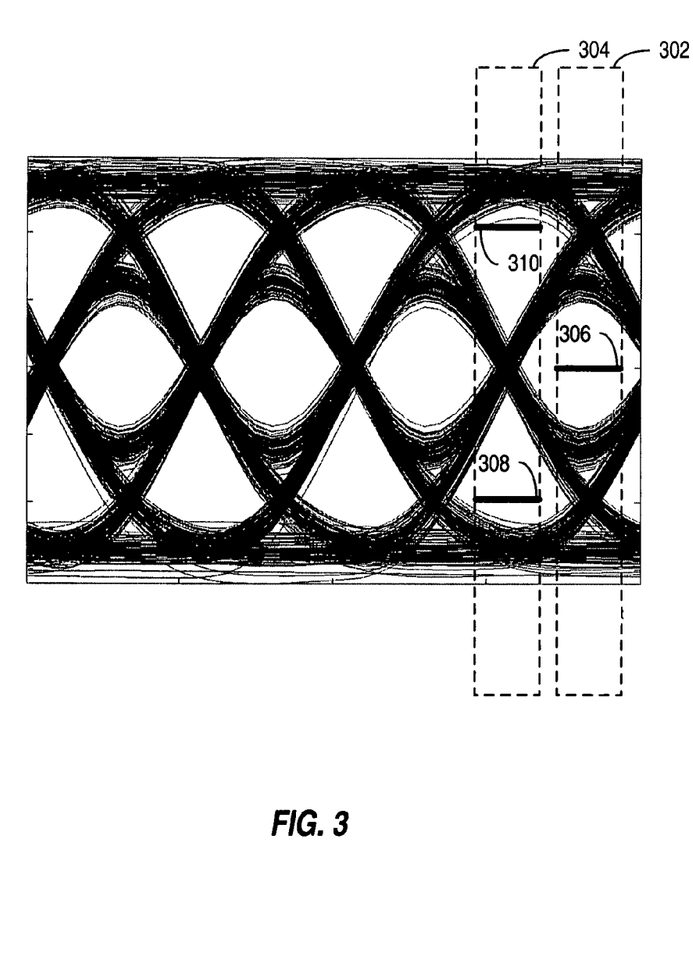
FIG. 3 illustrates an exemplary eye-pattern diagram of a received data stream utilizing a unified signaling technique.

Turning to FIG. 3, an exemplary eye-pattern diagram is illustrated, which may represent the eye-pattern of a data stream as received by DFE 216 of FIG. 2. FFE 218 applies a weighting function to shape each transmitted bit to eliminate, or minimize, ISI at the receiving end. The eye diagram of FIG. 3, for example, illustrates an eye-diagram of a unified signaling waveform that facilitates bit-centered, as well as bit-edge, sampling.

In particular, the weighting function may facilitate bit-centered sampling within NRZ detection window 302, whereby the received signal may be sampled using a single threshold value 306. That is to say, for example, that detected signal amplitudes greater than threshold 306 are mapped to a logic "1", whereas detected signal amplitudes less than threshold 306 are mapped to a logic "0".

The weighting function may also facilitate bit-edge sampling within DB detection window 304. Within DB detection window 304, the received signal must be sampled using two threshold values 308 and 310, since the sampled data within detection window 304 may take on one of 3 amplitudes. In particular, detected signal amplitudes greater than threshold 310 are mapped to a logic "1", detected signal amplitudes less than threshold 308 are mapped to a logic "−1", and detected signal amplitudes between threshold 308 and 310 are mapped to a logic "0". As discussed in more detail below, thresholds 306-310 are programmable and are illustrated to exist at positions where the eye openings are maximized, but may also be programmed to any level within the dynamic range of the received signal.

Figure 4:
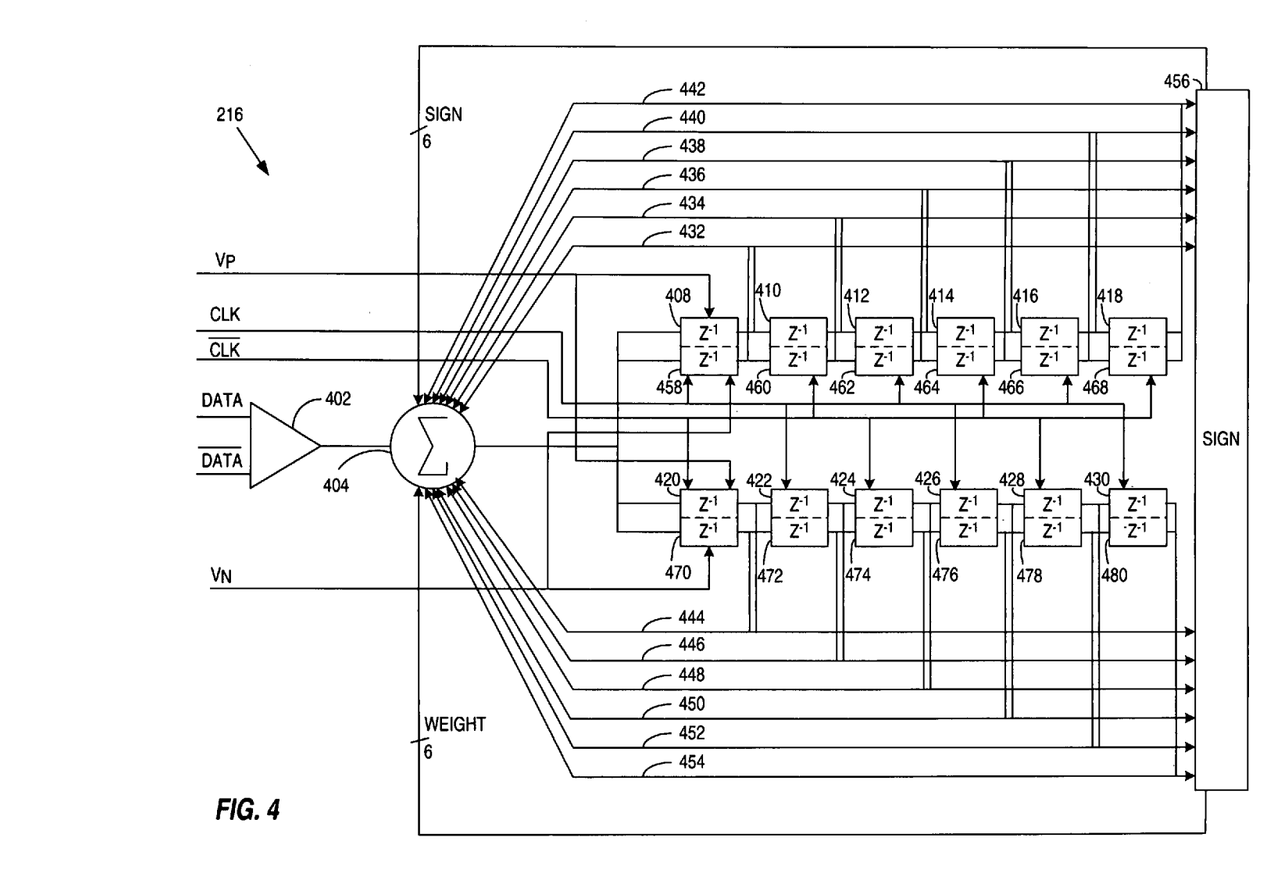
FIG. 4 illustrates an exemplary block diagram of the high speed DFE of FIG. 2.

Turning to FIG. 4, an exemplary block diagram of DFE 216 of FIG. 2 is illustrated. Amplifier 402 receives differential signal, DATA and $\overline{\text{DATA}}$, operating at a full-rate of up to, for example, 12.5 giga-bits per second (Gbps). The output of amplifier 402 is coupled to summer 404, which combines the output of amplifier 402 with feedback taps 432-454 to provide DFE corrected data at the output of summer 404.

Delay stages 408-418 and 458-468 represent RTZ shift registers that receive the full-rate data signal and sample the full-rate data signal at the rising edge of signal CLK or $\overline{\text{CLK}}$. In particular, it is noted that RTZ latches 408, 458, 412, 462, 416, and 466 for example, latch their respective data at the rising edge of signal CLK, whereas RTZ latches 410, 460, 414, 464, 418, and 468 latch their respective data at the rising edge of signal $\overline{\text{CLK}}$. The sampled, or sliced, data is then propagated throughout RTZ latches 408-418 and 458-468 to provide progressively delayed taps at half the full data rate.

Delay stages 420-430 and 470-480 also represent RTZ shift registers that receive the full-rate data signal and sample the full-rate data signal at the rising edge of signal CLK or $\overline{\text{CLK}}$. In particular, it is noted that RTZ latches 420, 470, 424, 474, 428, and 478, for example, latch their respective data at the rising edge of signal $\overline{\text{CLK}}$, whereas RTZ latches 422, 472, 426, 476, 430, and 480 latch their respective data at the rising edge of signal CLK. The sampled data is then propagated throughout RTZ latches 420-430 and 470-480 to provide progressively delayed taps at half the full data rate.

Thus, RTZ latches 408-418 (in NRZ mode) and RTZ latches 408-418 and 458-468 (in DB mode), capture every other full rate data bit, e.g., the even-numbered data bits, hold the data for the first half of the sampling clock cycle, and reset their outputs during the second half of the sampling clock cycle. Similarly, RTZ latches 420-430 (in NRZ mode) and RTZ latches 420-430 and 470-480 (in DB mode) capture every other data bit, e.g., the odd-numbered data bits: hold the data for the first half of the sampling clock cycle, and reset their outputs during the second half of the sampling clock cycle.

As discussed in more detail below, through operation of the set/reset aspects of the RTZ shift registers, timing of the feedback data delivered to summer 404 is guaranteed to allow proper DFE correction of the currently received bit. In other words, prior to sampling of the currently received data bit, data relating to a predetermined number of previously received data bits is properly signed and combined with the current data bit, so as to substantially remove/minimize any ISI effects caused by the predetermined number of previously received data bits.

Feedback data 432-454 are also provided to CDR 220 of FIG. 2, so that proper timing may be achieved to perform the de-serializing function. SIGN block 456 also receives feedback data 432-454, which uses an adaptive least mean square (LMS) algorithm to properly sign and weight each feedback tap by providing signals $SIGN_0$-$SIGN_5$ and $WEIGHT_0$-$WEIGHT_5$ to summing block 404 in response to feedback data 432-454. Once properly signed and weighted, information provided by feedback data 432-454 is then used to substantially remove ISI relating to the currently received data bit. It should be noted, that amplifier 402 and summer 404 may be completely incorporated into a single device as discussed in more detail below in relation to FIG. 7.

During NRZ detection, RTZ latches 408 and 420 implement a comparator function, such that the received data bit is compared to a programmable threshold value, $V_P$, to determine the logic value of the received data bit. Turning back to FIGS. 2 and 3, for example, configuration module 210 may program threshold voltage, $V_P$, to a voltage level that is equal to threshold level 306 to prepare for NRZ sampling within NRZ detection window 302. Subsequent RTZ latches 410-418 and 422-430 may also receive the programmable threshold voltage, $V_P$, as may be required by any given implementation.

As such, data bits having logic levels higher than threshold level 306 will be assigned to a logic "1", while data bits having logic levels lower than threshold level 306 will be assigned to a logic "0". Once the logic level of the received data bit is determined, the determined logic level is propagated to subsequent RTZ latches 410-418 and 422-430 as discussed in more detail below. Since NRZ detection window 302 requires detection between two logic levels, only a single threshold comparison is required. Thus, threshold level 306 may be programmed to the common mode value as shown, but may also be programmed anywhere within the dynamic range of the received signal.

During DB detection, RTZ latches 408, 458, 420, and 470 implement the comparator function, such that the received data bit is compared to programmable threshold values, $V_P$ and $V_N$, to determine the logic value of the received data bit. In this instance, two threshold values are required, since the determination between three logic levels is necessary. Turning back to FIGS. 2 and 3, for example, configuration module 210 may program threshold voltages, $V_P$ and $V_N$, to voltage levels that are equal to threshold levels 310 and 308, respectively, to prepare for DB sampling within DB detection window 304. Subsequent RTZ latches 410-418 and 422-430 may also receive the programmable threshold voltage, $V_P$, and subsequent RTZ latches 460-468 and 472-480 may also receive the programmable threshold voltage, $V_N$, as may be required by any given implementation.

As such, data bits received by RTZ latches 408 and 420 having logic levels higher than threshold level 310 will be assigned to a logic "1", while data bits received by RTZ latches 458 and 470 having logic levels lower than threshold level 308 will be assigned to a logic "−1". Data bits received by RTZ latches 408, 420, 458, and 470 having logic levels lower than threshold level 310, but higher than threshold level 308, will be assigned to a logic "0". Once the logic level of the received data bit is determined, the determined logic level is propagated to subsequent RTZ latches 410-418, 460-468, 422-430, and 472-480 as discussed in more detail below.

Figure 5:
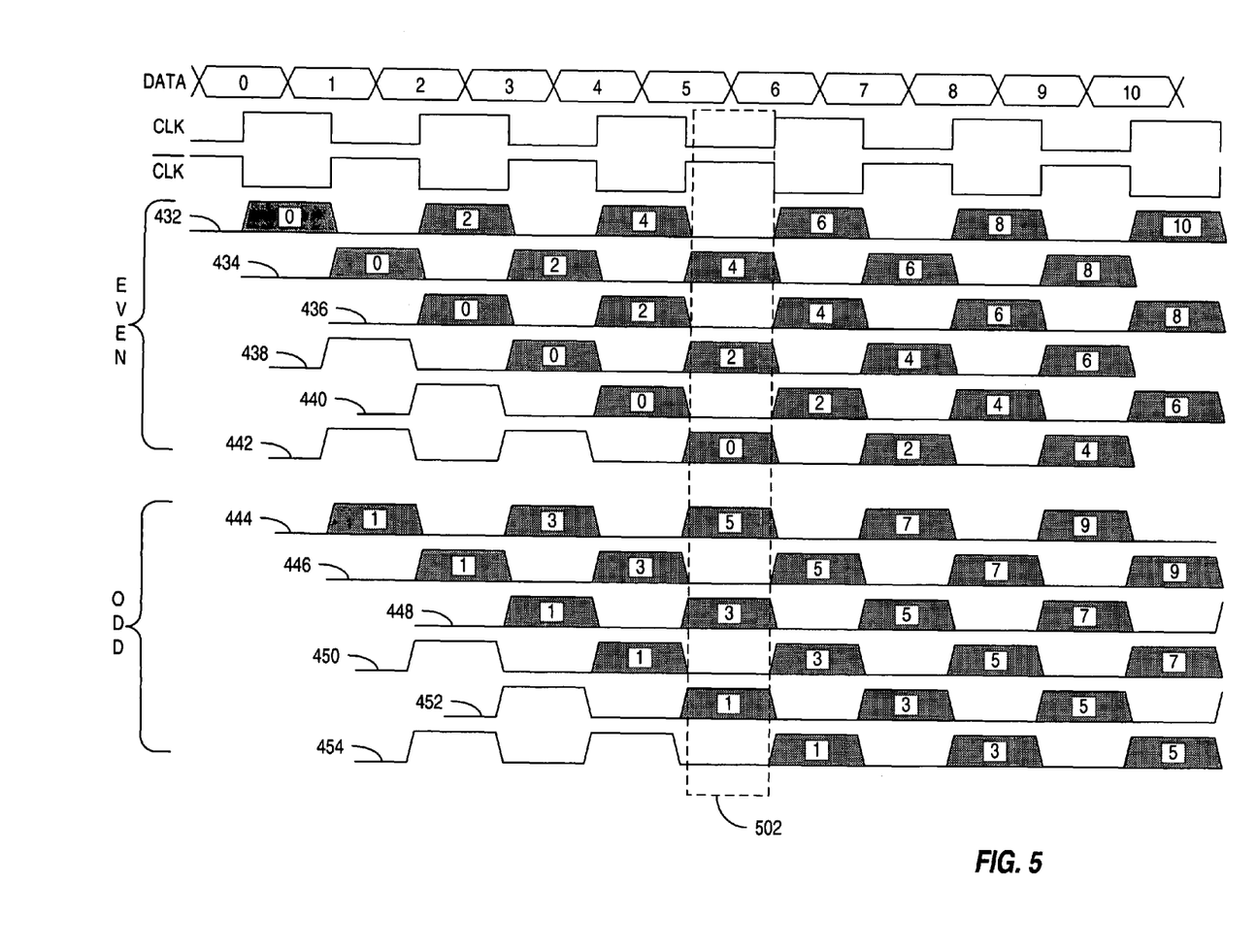
FIG. 5 illustrates an exemplary timing diagram of bit-centered sampling and associated feedback data of FIG. 4.

Turning to FIG. 5, an NRZ detection timing diagram is illustrated, which exemplifies the set/reset timing relationship regarding the RTZ shift registers of FIG. 4 and the data that is available at the output of RTZ latches 408-430 at, or prior to, each sampling instance. Signal DATA represents the full-rate data stream as received by amplifier 402 and signals CLK and $\overline{\text{CLK}}$ represent the clock signals as received by the corresponding RTZ latches 408-430. Data streams 432-454 represent the outputs of RTZ latches 408-430, respectively, where data streams 432-442 may be characterized as "even" data and data streams 444-454 may be characterized as "odd" data.

It can be seen by inspection that the even data stream is sampled by RTZ latches 408, 412, and 416 at the rising edge of signal CLK, while the even data stream is sampled by RTZ latches 410, 414, and 418 at the rising edge of signal $\overline{\text{CLK}}$. Similarly, the odd data stream is sampled by RTZ latches 420, 424, and 428 at the rising edge of signal $\overline{\text{CLK}}$, while the odd data stream is sampled by RTZ latches 422, 426, and 430 at the rising edge of signal CLK. RTZ latches 458-480 are disabled by configuration module 210 of FIG. 2 during NRZ detection.

Also seen by inspection, is the set/reset attribute that is associated with RTZ latch operation. With respect to data stream 432, for example, data bit 0 of signal DATA is sampled at the rising edge of signal CLK, which activates data bit 0 of data stream 432. Activation of data bit 0 of data stream 432 is defined such that the output state of RTZ latch 408 is either at a valid logic low, or a valid logic high value as determined by the comparison of data bit 0 with threshold value, $V_P$, as discussed above. The valid logic output state of RTZ latch 408 is only held valid for one half cycle of signal CLK, i.e., one UI.

Upon the subsequent falling edge of signal CLK (and, therefore, the rising edge of signal $\overline{\text{CLK}}$), RTZ latch 408 resets and RTZ latch 410 activates its output state at the rising edge of signal $\overline{\text{CLK}}$ with the previously activated logic state of RTZ latch 408, e.g., data bit 0. Signal flow through RTZ latches 412-418 similarly propagates data bit 0 until finally, as an example at time slot 502, data bit 0 exists at the output of RTZ latch 418. Meanwhile, other "even" data bits, e.g., data bit 2, data bit 4, etc., are propagated through RTZ latches 408-418 as illustrated. It is recognized that time slot 502 represents a time period equal to one UI.

Similarly with respect to data stream 444, for example, data bit 1 of signal DATA is sampled at the rising edge of signal $\overline{\text{CLK}}$, which activates data bit 1 of data stream 444. Activation of data bit 1 of data stream 444 is defined such that the output state of RTZ latch 420 is either at a valid logic low, or a valid logic high value as determined by the comparison of data bit 1 with threshold value, $V_P$, as discussed above. The valid logic output state of RTZ latch 420 is only held valid for one half cycle of signal $\overline{\text{CLK}}$, i.e., one UI.

Upon the subsequent falling edge of signal $\overline{\text{CLK}}$ (and, therefore, the rising edge of signal CLK), RTZ latch 420 resets and RTZ latch 422 activates its output state at the rising edge of signal CLK with the previously activated logic state of RTZ latch 420, e.g., data bit 1. Signal flow through RTZ latches 422-430 similarly propagates data bit 1 until finally, as an example, at the rising edge of signal CLK after time slot 502, data bit 1 exists at the output of RTZ latch 430. Meanwhile, other "odd" data bits, e.g., data bit 3, data bit 5, etc., are propagated through RTZ latches 420-430 as illustrated.

It is recognized that during time slot 502, half of RTZ latches 408-430 are activated and the other half are reset. In other words, reset RTZ latches 408, 412, 416, 422, 426, and 430 provide null, or zero, information at their output during time slot 502. The output of these reset latches, therefore, may be received directly by summer 404 without the need for any intervening logic, since they supply zero information and hence, have no effect on the output of summer 404.

Furthermore, for each RTZ latch 420-430 that is in a reset condition, the corresponding RTZ latch 408-418 is in an activated condition. For example, during time slot 502, RTZ latch 408 is in a reset condition, whereas its corresponding RTZ latch, e.g., RTZ latch 420, is in an activated condition. Similarly, RTZ latch 410 is in an activated condition, whereas its corresponding RTZ latch, e.g., RTZ latch 422, is in a reset condition. It can be seen that the reset/activated conditions similarly alternate for RTZ latches 412-418 and RTZ latches 424-430. Thus, during time slot 502, bits 0-5 are activated at the outputs of RTZ latches 418, 428, 414, 424, 410, and 420, respectively.

Time slot 502 represents a single UI in which operation of the DFE on, for example, data bit 6 of signal DATA takes place. In particular, it can be seen that the first rising edge of signal CLK subsequent to time slot 502, is responsible for sampling data bit 6 of signal DATA. Prior to sampling data bit 6, however, it is desired to correct data bit 6 using ISI information that is contained within the previously received consecutive data bits, e.g., data bits 0-5.

In this instance, data bits 0-5 are considered to be the consecutive logical post-cursor values to the current incoming data, e.g., currently received data bit 6. As such, appropriately signed and weighted post-cursor information is combined with the current cursor, such that any energy associated with data bits 0-5, i.e., ISI, that is present at data bit 6 may be subtracted/added from/to data bit 6. Thus, ISI relating to data bits 0-5 is substantially removed from data bit 6, prior to sampling data bit 6, by operation of DFE 216 as illustrated in FIG. 4. It should be noted, that the number of feedback taps may be increased (or decreased) as necessary to enhance ISI reduction. For example, a 10-bit tap structure may be implemented, whereby ISI due to the previously received 10 data bits may be removed from the current cursor.

By inspection of time slot 502 of the set/reset timing relationship of RTZ latches 408-430 as illustrated in FIG. 5, it can be seen that RTZ latches 410, 414, 418, 420, 424, and 428 are in their respective activated states. Conversely, RTZ latches 408, 412, 416, 422, 426, and 430 are in their respective reset states. Thus, data bits 0-5 of feedback data streams 442, 452, 438, 448, 434, and 444, respectively, are in their activated state, whereas the corresponding data bits of feedback data streams 432, 436, 440, 446, 450, and 454 are in their reset state. As such, data bits 0-5 are inherently activated by operation of RTZ latches 408-430 to implement the DFE of data bit 6. It can further be seen that for each time slot subsequent to time slot 502, data bits 1-6 are inherently activated to equalize currently received data bit 7; data bits 2-7 are inherently activated to equalize currently received data bit 8, and so on.

Figure 6:
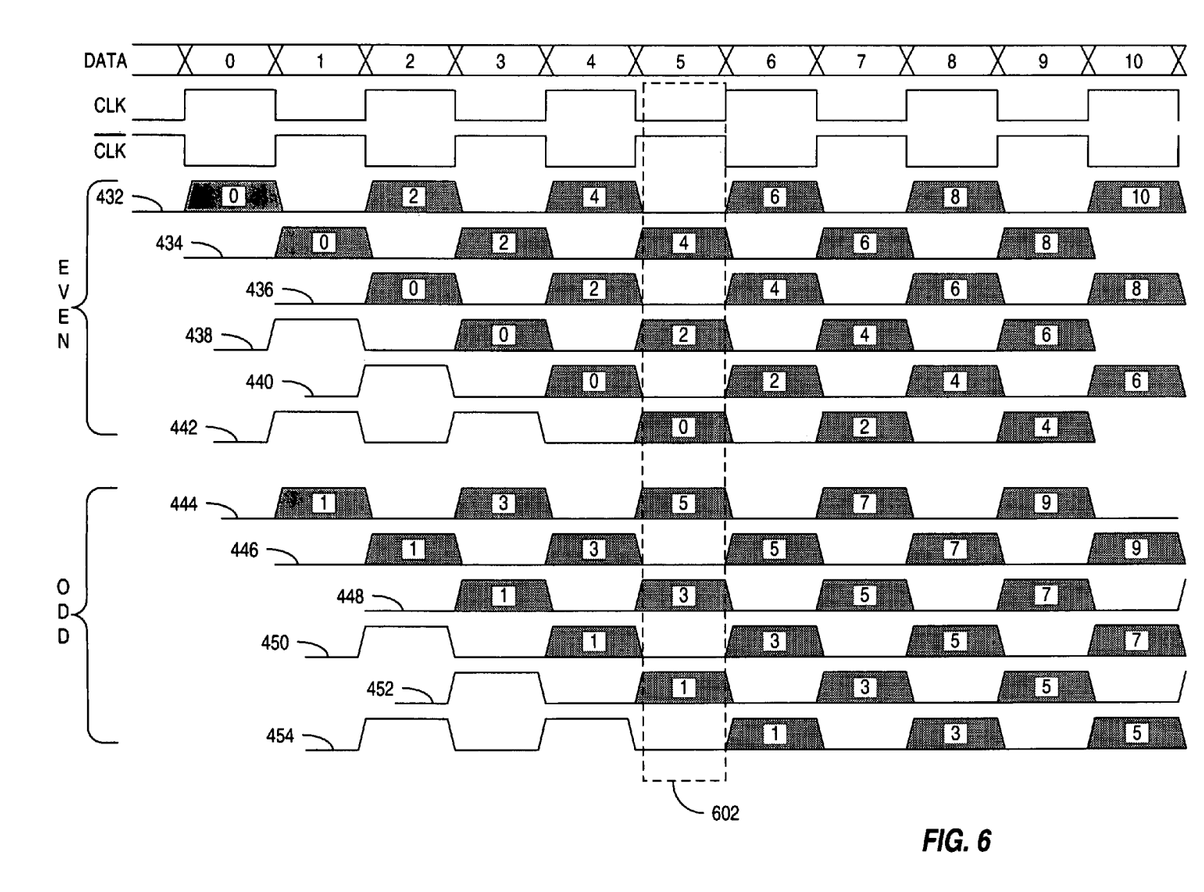
FIG. 6 illustrates an exemplary timing diagram of bit-edge sampling and associated feedback data of FIG. 4.

Turning to FIG. 6, a DB detection timing diagram is illustrated, which exemplifies the set/reset timing relationship regarding the RTZ shift registers of FIG. 4 and the data that is available at the output of RTZ latches 408-430 and 458-480 at, or prior, to each sampling instance. Signal DATA represents the full-rate data stream as received by amplifier 402 and signals CLK and $\overline{\text{CLK}}$ represent the clock signals as received by the corresponding RTZ latches 408-480. Data streams 432-442 represent the combined outputs of RTZ latches 408-418 and 458-468, respectively. Data streams 444-454 represent the combined outputs of RTZ latches 420-430 and 470-480, respectively. Data streams 432-442 may be characterized as "even" data and data streams 444-454 may be characterized as "odd" data.

It can be seen by inspection that the even data stream is sampled by RTZ latch pairs 408/458, 412/462, and 416/466 at the rising edge of signal CLK, while the even data stream is sampled by RTZ latch pairs 410/460, 414/464, and 418/468 at the rising edge of signal $\overline{\text{CLK}}$. Similarly, the odd data stream is sampled by RTZ latch pairs 420/470, 424/474, and 428/478 at the rising edge of signal $\overline{\text{CLK}}$, while the odd data stream is sampled by RTZ latch pairs 422/472, 426/476, and 430/480 at the rising edge of signal CLK. RTZ latches 458-480 are enabled by configuration module 210 of FIG. 2 during DB detection.

Also seen by inspection is the set/reset attribute that is associated with RTZ latch operation. With respect to data stream 432, for example, data bit 0 of signal DATA is sampled at the rising edge of signal CLK, which activates data bit 0 of data stream 432. Activation of data bit 0 of data stream 432 is defined such that the output state of RTZ latch 408 is either at a valid logic low, or a valid logic high value as determined by the comparison of data bit 0 with threshold value, $V_P$, as discussed above. Similarly, activation of data bit 0 of data stream 432 is further defined such that the output state of RTZ latch 458 is either at a valid logic low, or a valid logic high value as determined by the comparison of data bit 0 with threshold value, $V_N$, as discussed above. The valid logic output state of RTZ latches 408 and 458 is only held valid for one half cycle of signal CLK, i.e., one UI.

Upon the subsequent falling edge of signal CLK (and, therefore, the rising edge of signal $\overline{\text{CLK}}$), RTZ latch pair 408/458 reset and RTZ latch pair 410/460 activates its output state at the rising edge of signal $\overline{\text{CLK}}$ with the previously activated logic state of RTZ latch pair 408/458, e.g., data bit 0. Signal flow through RTZ latch pairs 412/462, 414/464, 416/466, and 418/468 similarly propagate data bit 0 until finally, as an example at time slot 602, data bit 0 exists at the output of RTZ latch pair 418/468. Meanwhile, other "even" data bits, e.g., data bit 2, data bit 4, etc., are propagated through RTZ latches 408-418 and 458-468 as illustrated. It is recognized that time slot 602 represents a time period equal to one UI.

Similarly with respect to data stream 444, for example, data bit 1 of signal DATA is sampled at the rising edge of signal $\overline{\text{CLK}}$, which activates data bit 1 of data stream 444. Activation of data bit 1 of data stream 444 is defined such that the output state of RTZ latch 420 is either at a valid logic low, or a valid logic high value as determined by the comparison of data bit 1 with threshold value, $V_P$, as discussed above. Similarly, activation of data bit 1 of data stream 444 is further defined such that the output state of RTZ latch 470 is either at a valid logic low, or a valid logic high value as determined by the comparison of data bit 1 with threshold value, $V_N$, as discussed above. The valid logic output state of RTZ latch pair 420/470 is only held valid for one half cycle of signal $\overline{\text{CLK}}$, i.e., one UI.

Upon the subsequent falling edge of signal $\overline{\text{CLK}}$ (and, therefore, the rising edge of signal CLK), RTZ latch pair 420/470 reset and RTZ latch pair 422/472 activates its output state at the rising edge of signal CLK with the previously activated logic state of RTZ latch pair 420/470, e.g., data bit 1. Signal flow through RTZ latch pairs 422/472, 424/474, 426/476, 428/478, and 430/480 similarly propagates data bit 1 until finally, as an example, at the rising edge of signal CLK after time slot 602, data bit 1 exists at the output of RTZ latch pair 430/480. Meanwhile, other "odd" data bits, e.g., data bit 3, data bit 5, etc., are propagated through RTZ latches 420-430 and 470-480 as illustrated.

It is recognized that during time slot 602, half of RTZ latches 408-430 and 458-480 are activated and the other half are reset. In other words, reset RTZ latch pairs 408/458, 412/462, 416/466, 422/472, 426/476, and 430/480 provide null, or zero, information at their output during time slot 602. The output of these reset latch pairs, therefore, may be received directly by summer 404 without the need for any intervening logic, since they supply zero information and hence, have no effect on the output of summer 404.

Furthermore, for each RTZ latch pair that is in a reset condition, the corresponding RTZ latch pair is in an activated condition. For example, during time slot 602, RTZ latch pair 408/458 is in a reset condition, whereas its corresponding RTZ latch pair, e.g., RTZ latch pair 420/470, is in an activated condition. Similarly, RTZ latch pair 410/460 is in an activated condition, whereas its corresponding RTZ latch pair, e.g., RTZ latch pair 422/472, is in a reset condition. It can be seen that the reset/activated conditions similarly alternate for RTZ latch pairs 412-418/462-468, respectively, and RTZ latch pairs 424-430/474-480, respectively. Thus, during time slot 602, bits 0-5 are activated at the outputs of RTZ latch pairs 418/468, 428/478, 414/464, 424/474, 410/460, and 420/470, respectively.

Time slot 602 represents a single UI in which operation of the DFE on, for example, data bit 6 of signal DATA takes place. In particular, it can be seen that the first rising edge of signal CLK subsequent to time slot 602, is responsible for sampling data bit 6 of signal DATA. Prior to sampling data bit 6, however, it is desired to correct data bit 6 using ISI information that is contained within the previously received consecutive data bits, e.g., data bits 0-5.

In this instance, data bits 0-5 are considered to be the consecutive logical post-cursor values to the current incoming data, e.g., currently received data bit 6. As such, appropriately signed and weighted post-cursor information is combined with the current cursor, such that any energy associated with data bits 0-5, i.e., ISI, that is present at data bit 6 may be subtracted/added from/to data bit 6. Thus, ISI relating to data bits 0-5 is substantially removed from data bit 6, prior to sampling data bit 6, by operation of DFE 216 as illustrated in FIG. 4.

By inspection of time slot 602 of the set/reset timing relationship of RTZ latches 408-430 and 458-480 as illustrated in FIG. 6, it can be seen that RTZ latch pairs 410/460, 414/464, 418/468, 420/470, 424/474, and 428/478 are in their respective activated states. Conversely, RTZ latch pairs 408/458, 412/462, 416/466, 422/472, 426/476, and 430/480 are in their respective reset states. Thus, data bits 0-5 of feedback data streams 442, 452, 438, 448, 434, and 444, respectively, are in their activated state, whereas the corresponding data bits of feedback data streams 432, 436, 440, 446, 450, and 454 are in their reset state. As such, data bits 0-5 are inherently activated by operation of RTZ latches 408-430 and 458-480 to implement the DFE of data bit 6. It can further be seen that for each time slot subsequent to time slot 602, data bits 1-6 are inherently activated to equalize currently received data bit 7; data bits 2-7 are inherently activated to equalize currently received data bit 8, and so on.

Figure 7:
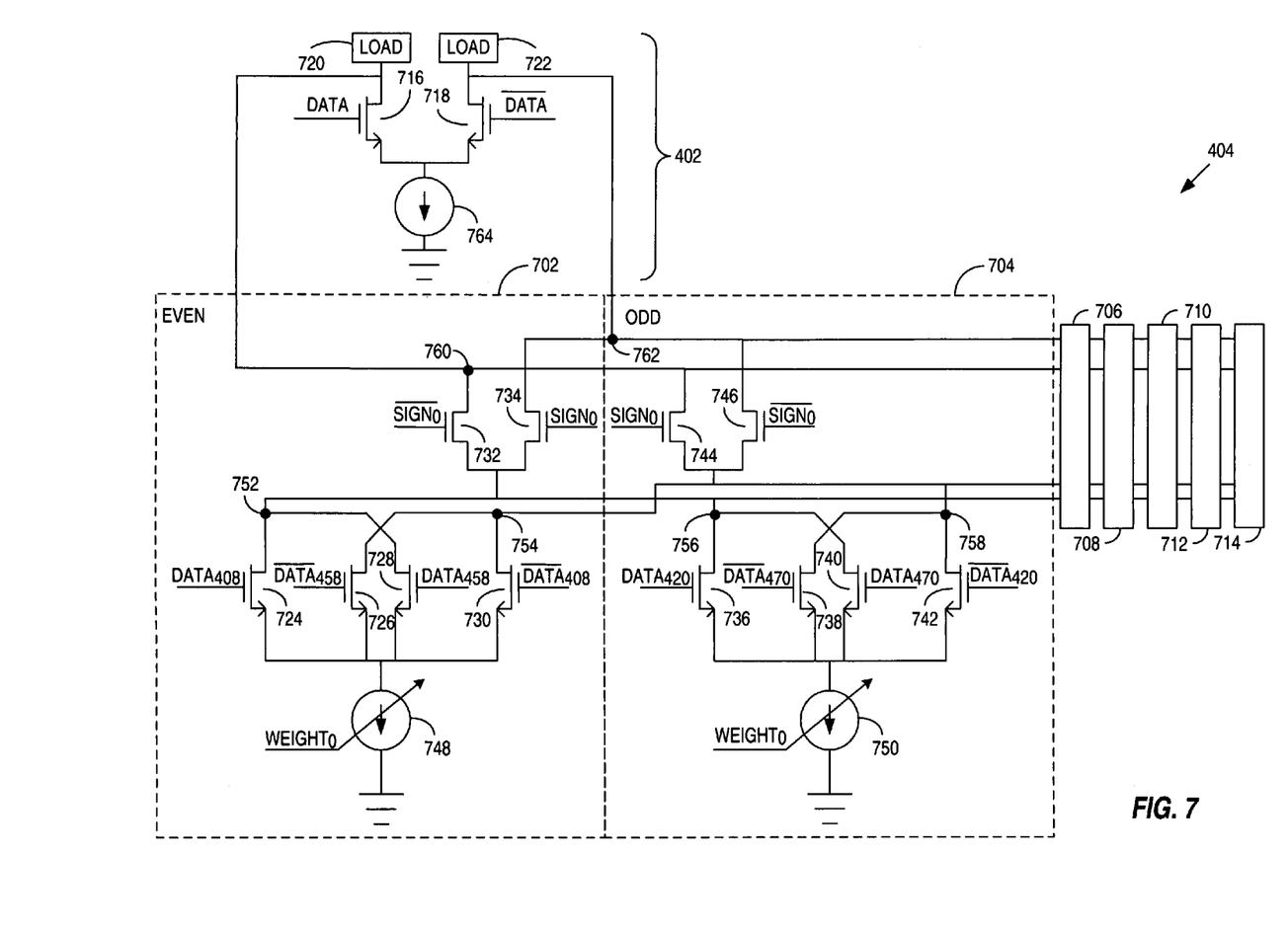
FIG. 7 illustrates an exemplary schematic diagram of a summing node of the DFE of FIG. 4.

Turning to FIG. 7, an exemplary schematic diagram of amplifier 402 and summer 404 of FIG. 4 is illustrated. Even data summation node 702 and odd data summation node 704 of summer 404 are shown in detail, whereas data summation nodes 706-714 are represented in block notation. It is appreciated that summation nodes 706-714 each contain an even data summation node and an odd data summation node that are identical to the even and odd data summation nodes 702 and 704, respectively. Even/odd data summation nodes 702 and 704 comprise the first tap of DFE 216, while data summation nodes 706-714 comprise the remaining 5 taps of DFE 216, where DFE 216 is exemplified as a 6-tap DFE. As is discussed elsewhere, other tap values, such as a 10-tap DFE, may also be supported.

Even data summation node 702, for example, represents a summation node for even data, as provided by RTZ latches 408 and 458, which is received by differential transistor pairs 724/730 and 728/726, respectively. In addition, signal $SIGN_0$ and $WEIGHT_0$, as generated by SIGN block 456 of FIG. 4, is received by differential transistor pair 734/732 and current source/sink 748, respectively.

Similarly, odd data summation node 704, for example, represents a summation node for odd data, as provided by RTZ latches 420 and 470, which is received by differential transistor pairs 736/742 and 740/738, respectively. In addition, signal $SIGN_0$ and $WEIGHT_0$, as generated by SIGN block 456 of FIG. 4, is received by differential transistor pair 744/746 and current source/sink 750, respectively. Even data streams 434-442 and odd data streams 446-454, as well as signals $SIGN_1$-$SIGN_5$ and $WEIGHT_1$-$WEIGHT_5$, are similarly received by summing nodes 706-714 to complete 6-tap DFE 216 as exemplified in FIG. 4.

In operation, differential transistor pairs 724/730 and 728/726 convert even data stream 432 into current signals that are conducted by current source 748. Differential transistor pairs 736/742 and 740/738 convert odd data stream 444 into current signals that are conducted by current source 750. As discussed above, RTZ latches 408 and 420 are activated during all detection modes, e.g., NRZ and DB, while RTZ latches 458 and 470 are only activated during DB detection, where activation is subject to the timing diagrams of FIGS. 5 and 6.

In particular for even data summation node 702, if NRZ detection mode is active, then differential transistor pair 724/730 performs a voltage to current (V-I) conversion of data received from RTZ latch 408, i.e., $DATA_{408}$, such that one transistor of the differential transistor pair 724/730 is rendered conductive and the other transistor is rendered relatively non-conductive. If DB detection mode is active, then differential transistor pair 728/726 also performs a voltage to current (V-I) conversion of data received from RTZ latch 458, i.e., $DATA_{458}$, such that one transistor of the differential transistor pair 728/726 is rendered conductive and the other transistor is rendered relatively non-conductive.

Similarly, for odd data summation node 704, if NRZ detection mode is active, then differential transistor pair 736/742 performs a voltage to current (V-I) conversion of data received from RTZ latch 420, i.e., $DATA_{420}$, such that one transistor of the differential transistor pair 736/742 is rendered conductive and the other transistor is rendered relatively non-conductive. If DB detection mode is active, then differential transistor pair 740/738 also performs a voltage to current (V-I) conversion of data received from RTZ latch 470, i.e., $DATA_{470}$, such that one transistor of the differential transistor pair 740/738 is rendered conductive and the other transistor is rendered relatively non-conductive.

Due to the connection between the output of RTZ latches 408,458 and 420,470 and the corresponding digital to analog conversion within summation nodes 702 and 704, the current conducted by current sources 748 and 750 is guaranteed to flow through one transistor of their respective differential transistor pairs at any given instant in time. As such, the amplitude and direction of current flowing into nodes 752-758 is virtually guaranteed to stay within the appropriate operating region with the right correction.

As can be seen from the NRZ detection timing diagram of FIG. 5 and the DB detection timing diagram of FIG. 6, transistor pairs 724/730 and 736/742 will never be in a simultaneous conductive state during any given UI and transistor pairs 728/726 and 740/738 will never be in a simultaneous conductive state during the same UI. This can be seen by virtue of the RTZ shift register operation, i.e., that even and odd data bits of corresponding data streams are never active at the same time. Corresponding data streams are those odd and even data streams that have been subjected to equivalent amounts of RTZ latch delay, such as data streams 432/444, 434/446, etc.

NRZ Detection

Given an NRZ detection operation, as discussed above in relation to NRZ detection window 302 of FIG. 3, and for any given UI, several of RTZ latches 408-418 are in a reset condition, and the corresponding RTZ latches are in an activated condition. Furthermore, the RTZ latch that is activated provides a data bit during one UI that is either at a logic high level, or at a logic low level. For example, if the data input to the activated RTZ latch is below threshold 306, as programmed by threshold voltage $V_P$, then the data bit is detected at a logic low level. Otherwise, the data bit is detected at a logic high level.

Returning to FIG. 5, summation node 702 is deactivated during time slot 502, since signal data stream 432 is in a reset condition and data stream 444 is in an activated condition. The particular data bit within data stream 444, e.g., data bit 5, is either at a logic high level, or at a logic low level. Accordingly, only one of transistors 736 or 742 is conductive, depending upon the logic state of data bit 5.

Thus, only one of transistors 736 or 742 is responsible for conducting current through nodes 756 or 758, respectively. In a first phase, for example, data bit 5 of data stream 344 is at a logic high value. Furthermore, if the logic state of signal $SIGN_0$ is at a logic high value and the logic state of signal $\overline{SIGN_0}$ is at a logic low value, thus rendering transistors 734 and 744 conductive and transistors 732 and 746 non-conductive, then the current conducted by load 722 increases by virtue of the conductive states of transistors 736 and 734. In such an instance, the voltage at node 762 is reduced with respect to the voltage at node 760.

Conversely, if the logic value of signal $SIGN_0$ is at a logic low value and the logic value of signal $\overline{SIGN_0}$ is at a logic high value, thus rendering transistors 732 and 746 conductive and transistors 734 and 744 non-conductive, then the current conducted by load 720 increases by virtue of the conductive state of transistors 736 and 732. In such an instance, the voltage at node 760 is reduced with respect to the voltage at node 762. Hence, a signed operation is facilitated, since depending upon the logic state of the sign bit, the voltage at node 760, or the voltage at node 762, is decreased.

In a second phase, data bit 5 of data stream 344 is at a logic low value. Furthermore, if the logic state of signal $SIGN_0$ is at a logic high value and the logic state of signal $\overline{SIGN_0}$ is at a logic low value, thus rendering transistors 734 and 744 conductive and transistors 732 and 746 non-conductive, then the current conducted by load 720 increases by virtue of the conductive states of transistors 742 and 744. In such an instance, the voltage at node 760 is reduced with respect to the voltage at node 762.

Conversely, if the logic value of signal $SIGN_O$ is at a logic low value and the logic value of signal $\overline{SIGN}_O$ is at a logic high value, thus rendering transistors 732 and 746 conductive and transistors 734 and 744 non-conductive, then the current conducted by load 722 increases by virtue of the conductive state of transistors 742 and 746. In such an instance, the voltage at node 762 is reduced with respect to the voltage at node 760. Hence, a signed operation is facilitated, since depending upon the logic state of the sign bit, the voltage at node 760, or the voltage at node 762, is decreased.

It should be noted that signal $WEIGHT_O$, as generated by SIGN block 456 of FIG. 4, controls the magnitude of current sources 748 and 750. In such an instance, the magnitude of the voltage drop at nodes 760 and 762 is controlled by signal $WEIGHT_O$. Accordingly, the variation in output voltage of summing nodes 702 and 704 in response to the odd and even feedback data streams, 432 and 444, respectively, may be controlled. Similarly, each of summing nodes 706-714 have identical connections to complete the summation of even data streams 434-442 and odd data streams 446-454 to provide DFE during NRZ detection operation.

DB Operation

Given a DB detection operation, as discussed above in relation to detection window 304 of FIG. 3, and for any given UI, several of RTZ latch pairs 408-418/458-468 and 420-430/470-480 are in a reset condition, and the corresponding RTZ latch pairs are in an activated condition. Furthermore, each RTZ latch pair that is activated provide data bits during one UI that are either at a logic high level, or at a logic low level.

For example, assuming that RTZ latch pair 408/458 is activated and that the data input to RTZ latch 458 is below threshold 308, as programmed by threshold voltage $V_N$, then the data bit at the output of the RTZ latch 458 is at a logic low level. If the data input to RTZ latch 458 is above threshold 308, on the other hand, then the data bit at the output of RTZ latch 458 is at a logic high level. If the data input to RTZ latch 408 is above threshold 310, as programmed by threshold voltage $V_P$, then the data bit at the output of RTZ latch 408 is at a logic high level. If the data input to RTZ latch 408 is below threshold 310, on the other hand, then the data bit at the output of RTZ latch 408 is at a logic low level. If the data input to RTZ latch 408 is below threshold 310 and the data input to RTZ latch 458 is above threshold 308, then the output of RTZ latch 408 is at a logic low level and the output of RTZ latch 458 is at a logic high level.

Thus, the outputs of RTZ latch pair 408/458 may define one of three detection states as defined in Table 1: 1) when both outputs provide logic low levels, then a logic "−1" is detected; 2) when the output of RTZ latch 408 provides a logic low level and the output of RTZ latch 458 provides a logic high level, then a logic "0" is detected; or 3) when both outputs provide logic high levels, then a logic "1" is detected. The outputs of the other RTZ latch pairs may be similarly defined.

TABLE 1

| DETECTION STATE | DFE CORRECTION |
| --- | --- |
| 1 | Differential current adjustment as defined by $SIGN_O$ and $WEIGHT_O$ bits |
| 2 | No differential current adjustment |
| 3 | Opposite differential current adjustment relative to detection state #1 |

As discussed in more detail below, detection states #1 and #3 define logic conditions, whereby DFE correction may be effectively implemented through appropriate differential current adjustment during a non-transition data detection window. That is to say, for example, that since both RTZ latches 408/458 are detecting consistent logic values during detection states #1 and #3, it can be said that the data bit being sampled is not in a transition state. Thus, differential current adjustment may be implemented, in conformance with bits $SIGN_O$ and $WEIGHT_O$, to effect the appropriate DFE correction.

During detection state #2, on the other hand, the data bit being sampled is in a transition state, whereby the data bit is either transitioning from a logic "1" to a logic "−1", or conversely, the data bit is transitioning from a logic "−1" to a logic "1". Thus, during detection state #2, the differential current induced by the outputs of RTZ latches 408/458 oppose each other to produce a net zero differential current resulting in no DFE correction.

Returning to FIG. 6, summation node 702 is deactivated during time slot 602, since signal data stream 432 is in a reset condition and data stream 444 is in an activated condition. The particular data bit within data stream 444, e.g., data bit 5, results in one of the three detection states as discussed above.

In the first detection state, as defined in Table 1, RTZ latches 420 and 470 provide a logic low value, thus transistors 738 and 742 are conductive, while transistors 736 and 740 are non-conductive. Thus, transistors 738 and 742 are responsible for conducting current through node 758. Furthermore, if the logic state of signal $SIGN_O$ is at a logic high value and the logic state of signal $\overline{SIGN}_O$ is at a logic low value, thus rendering transistors 734 and 744 conductive and transistors 732 and 746 non-conductive, then the current conducted by load 720 increases by virtue of the conductive states of transistors 738, 742, and 744. In such an instance, the voltage at node 760 is lowered with respect to the voltage at node 762.

Conversely, if the logic value of signal $SIGN_O$ is at a logic low value and the logic value of signal $\overline{SIGN}_O$ is at a logic high value, thus rendering transistors 732 and 746 conductive and transistors 734 and 744 non-conductive, then the current conducted by load 722 increases by virtue of the conductive states of transistors 738, 742, and 746. Hence, a signed operation is facilitated, since depending upon the logic state of the sign bit, the voltage at node 760, or the voltage at node 762, is decreased.

In the second detection state, as defined in Table 1, RTZ latch 420 provides a logic low level and RTZ latch 470 provides a logic high level, thus transistors 742 and 740 are conductive, while transistors 736 and 738 are non-conductive. Thus, transistors 740 and 742 are responsible for conducting current through nodes 756 and 758, respectively. Furthermore, if the logic state of signal $SIGN_O$ is at a logic high value and the logic state of signal $\overline{SIGN}_O$ is at a logic low value, thus rendering transistors 734 and 744 conductive and transistors 732 and 746 non-conductive, then the current conducted by loads 720 and 722 increases by the same amount, thus providing no change in the differential voltage at nodes 760 and 762. Toggling the logic states of signal $SIGN_O$ and signal $\overline{SIGN}_O$ results in the same lack of change of differential voltage at nodes 760 and 762. Thus, in the second detection state, no DFE correction is performed.

In the third detection state, as defined in Table 1, RTZ latches 420 and 470 provide a logic high level, thus transistors 736 and 740 are conductive, while transistors 738 and 742 are non-conductive. Thus, transistors 736 and 740 are responsible for conducting current through node 756. Furthermore, if the logic state of signal $SIGN_O$ is at a logic high value and the logic state of signal $\overline{SIGN}_O$ is at a logic low value, thus rendering transistors 734 and 744 conductive and transistors 732 and 746 non-conductive, then the current conducted by load 722 increases by virtue of the conductive states of transistors 736, 740, and 734.

Conversely, if the logic value of signal $SIGN_O$ is at a logic low value and the logic value of signal $\overline{SIGN_O}$ is at a logic high value, thus rendering transistors 732 and 746 conductive and transistors 734 and 744 non-conductive, then the current conducted by load 720 increases by virtue of the conductive states of transistors 736, 740, and 732. Hence, a signed operation is facilitated, since depending upon the logic state of the sign bit, the voltage at node 760, or the voltage at node 762, is decreased.

Differential amplifier 402 of FIG. 4 may be implemented with transistors 716 and 718, loads 720 and 722, and current source 764, where loads 720 and 722 may either be passive or active. In operation, the 6-tap summation current at nodes 760 and 762 is summed at loads 720 and 722 with the current conducted by transistors 716 and 718 in response to input data signal DATA and $\overline{DATA}$. As such, the output voltage generated at nodes 760 and 762, represents the equalized signal for the currently received data bit, since the 6-tap summation currents, in summation nodes 702-714, have been appropriately signed and weighted to equalize the currently received data bit.

Note that processing delay is significantly reduced by taking advantage of the timing relationships of the odd and even data streams as exemplified in FIGS. 5 and 6 in combination with the feedback circuitry of FIG. 7. First, the appropriate feedback taps are inherently activated at each UI to correct the currently received data bit. Taking time slot 502, for example, data bits 0-5, are inherently activated by RTZ latch operation and immediately summed to correct data bit 6 without any further data processing being necessary. That is to say, for example, that not only are the feedback taps used to correct the currently received data bit inherently activated, but the feedback taps that are not used for data bit correction are also inherently deactivated. Thus, no additional logic is necessary to select between the activated and deactivated feedback taps, which substantially decreases the feedback processing time required.

Next, the feedback voltage is converted to current by operation of the current steering networks of summation nodes 702-714 as discussed above. Next, the feedback current is summed with current generated as a result of the currently received data bit by operation of differential amplifier 402. Finally, the summed current is conducted by loads 720 and 722 to convert the summed current back into voltage at nodes 760 and 762 at the full-rate. Thus, through inherently activated feedback and current mode mixing, the feedback taps may be immediately summed to implement a parallel to serial conversion, so that each data bit received may be corrected at the full rate prior to sampling.

Figure 8:
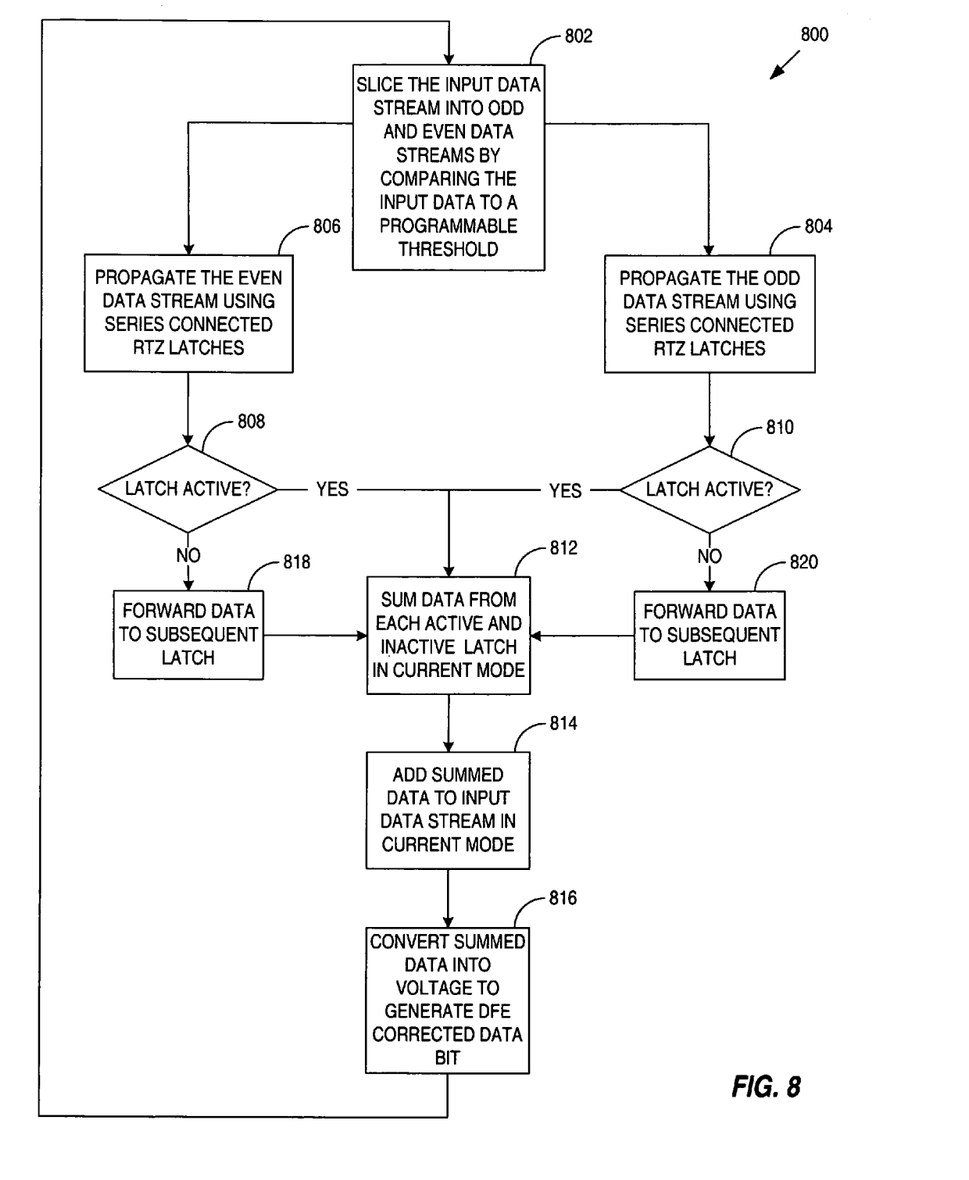
FIG. 8 illustrates an exemplary flow diagram of a method of performing decision feedback equalization (DFE).

Turning to FIG. 8, flow diagram 800 is presented, in which an exemplary method of performing high speed DFE is illustrated and explained in relation to FIGS. 3-7. In step 802, an input data stream running at full rate is sliced into odd and even data streams. For example, the full rate data stream, DATA, is sliced into an even data stream by RTZ latches 408/458 and the full rate data stream, DATA, is sliced into an odd data stream by RTZ latches 420/470. In particular, the even data stream is generated at the rising edge of signal CLK to latch all even data bits at RTZ latches 408/458. The odd data stream, on the other hand, is generated at the rising edge of signal $\overline{CLK}$ to latch all odd data bits at RTZ latches 420/470.

RTZ latches 408 and 420 receive a programmable voltage, $V_P$, which as discussed above, is effective to set threshold value 306 for NRZ detection or threshold value 310 for DB detection. RTZ latches 458 and 470, on the other hand, receive a programmable voltage, $V_N$, which as discussed above, is effective to set threshold value 308 for DB detection.

The even data bits are then propagated through the remaining RTZ latches 410-418 and 460-468 through use of either the rising edge of signal CLK or the rising edge of signal $\overline{CLK}$ as in step 806. In particular, even data bits are latched by the rising edge of signal CLK at RTZ latches 412/462 and 416/466, while even data bits are latched by the rising edge of signal $\overline{CLK}$ at RTZ latches 410/460, 414/464, and 418/468. Likewise, odd data bits are propagated through the remaining RTZ latches 422-430 and 472-480 through use of either the rising edge of signal CLK or the rising edge of signal $\overline{CLK}$ as in step 804. In particular, odd data bits are latched by the rising edge of signal $\overline{CLK}$ at RTZ latches 424/474 and 428/478, while odd data bits are latched by the rising edge of signal CLK at RTZ latches 422/472, 426/476, and 430/480.

In steps 808 and 810, RTZ latches 408-480 are either in an active state, or they are in an inactive state. For example, time slot 502 depicts an exemplary UI, in which RTZ latches 408, 412, 416, 422, 426, and 430 are inactive and RTZ latches 410, 414, 418, 420, 424, and 428 are active. If inactive, then the RTZ latch first propagates its latched data bit to the subsequent RTZ latch as in steps 818 and 820. For example, data bit 4 propagates from RTZ latch 408 to RTZ latch 410 at the rising edge of signal $\overline{CLK}$, while RTZ latch 408 deactivates its output at the falling edge of signal CLK. Similarly, data bit 3 propagates from RTZ latch 422 to RTZ latch 424 at the rising edge of signal $\overline{CLK}$, while RTZ latch 422 deactivates its output at the falling edge of signal CLK.

Regardless of whether the RTZ latch is activated or deactivated, each output of RTZ latches 408-480 are summed as discussed above in relation to FIG. 7. Since RTZ latches 408, 412, 416, 422, 426, and 430 are inactive during UI 502, for example, their respective outputs may be directly summed with the outputs of RTZ latches 410, 414, 418, 420, 424, and 428 without the need for intervening logic as in step 812. Further, all activated RTZ latch outputs are properly signed, weighted, and summed in current mode, as discussed above in relation to FIG. 7, to implement a parallel to serial conversion of the feedback signals.

Once the feedback signals have been properly signed, weighted, and summed, they may be added in current mode to the currently received input data bit at the full rate as in step 814. Once the currently received input data bit is corrected in current mode, it may then be converted to voltage, as in step 816, prior to sampling. For example, the rising edge of signal CLK, immediately subsequent to UI 502, is used to sample data bit 6. By then, however, previously received data bits 0-5 have been used to substantially rid data bit 6 of ISI that was contributed by data bits 0-5. Once sampled, the process repeats to correct subsequently received data bits.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of performing decision feedback equalization (DFE) of a currently received data bit, comprising:
coupling input data bits having the currently received data bit to a summing circuit;
propagating a first portion of the input data bits through a first plurality of latches, wherein propagating the first portion of the input data bits comprises clocking the first plurality of latches with first and second clock signals;

propagating a second portion of the input data bits through a second plurality of latches, wherein propagating the second portion of the input data bits comprises clocking the second plurality of latches with the first and second clock signals;

resetting a first group of the first and second plurality of latches to a zero state during a time period;

activating a second group of the first and second plurality of latches during the time period, wherein a portion of the activated latches are adapted to detect multiple levels of the input data bits by comparison to a programmable threshold;

combining the outputs of the activated latches during the time period;

summing the currently received input data bit with the combined outputs during the time period to equalize the currently received input data bit; and generating an output data bit at an output of the summing circuit during the time period, the summing circuit being coupled to the first group of the first and second plurality of latches and the second group of the first and second plurality of latches.

2. The method of claim 1, wherein a first latch of the first plurality of latches and the second group of the first and second plurality of latches compares the first portion of input data bits to a first programmable threshold to determine a first value of the first portion of input data bits.

3. The method of claim 2, wherein a first latch of the second plurality of latches and the second group of the first and second plurality of latches compares the second portion of input data bits to the first programmable threshold to determine a first value of the second portion of input data bits.

4. The method of claim 3, wherein summing the currently received input data bit with the combined outputs comprises:
converting the outputs of the activated latches to a first current signal;
converting the input data bit to a second current signal;
summing the first and second current signals to produce a summed current signal; and
converting the summed current signal to a voltage signal.

5. The method of claim 3, wherein a second latch of the first plurality of latches and the second group of the first and second plurality of latches compares the first portion of input data bits to a second programmable threshold to determine a second value of the first portion of input data bits.

6. The method of claim 5, wherein a second latch of the second plurality of latches and the second group of the first and second plurality of latches compares the second portion of input data bits to the second programmable threshold to determine a second value of the second portion of input data bits.

7. The method of claim 6, wherein summing the currently received input data bit with the combined outputs comprises:
converting the outputs of the activated latches to a first current signal, wherein a contribution of current to the first current signal from the first and second latches of the first and second plurality of latches is zero when the first and second values are different;
converting the input data bit to a second current signal;
summing the first and second current signals to produce a summed current signal; and
converting the summed current signal to a voltage signal.

8. A decision feedback equalizer (DFE), comprising:
a first shift register coupled to receive an input data stream and a first programmable threshold and coupled to provide a first portion of previously received data bits whose values are determined by comparison to the first programmable threshold, wherein the first portion of the previously received data bits are propagated by clocking the first shift register with first and second clock signals,
wherein a first group of data bits of the first portion are activated and a second group of data bits of the first portion are reset to a zero state;
a second shift register coupled to receive the input data stream and the first programmable threshold and coupled to provide a second portion of the previously received data bits whose values are determined by comparison to the first programmable threshold, wherein the second portion of the previously received data bits are propagated by clocking the second shift register with the first and second clock signals,
wherein a third group of data bits of the second portion are activated and a fourth group of data bits of the second portion are reset to a zero state; and
a summation block coupled to receive the input data stream and coupled to the first and second shift registers and adapted to sum a currently received data bit of the input data stream with the first and second portions of the previously received data bits, wherein the summation block is adapted to combine the activated and the reset groups of data bits to equalize the currently received data bit.

9. The DFE of claim 8, further comprising:
a third shift register coupled to receive the input data stream and a second programmable threshold and coupled to provide a third portion of previously received data bits whose values are determined by comparison to the second programmable threshold,
wherein a fifth group of data bits of the third portion are activated and a sixth group of data bits of the third portion are reset to a zero state;
a fourth shift register coupled to receive the input data stream and the second programmable threshold and coupled to provide a fourth portion of the previously received data bits whose values are determined by comparison to the second programmable threshold,
wherein a seventh group of data bits of the fourth portion are activated and an eighth group of data bits of the fourth portion are reset to a zero state, and
wherein the summation block is further coupled to the third and fourth shift registers.

10. The DFE of claim 9, wherein the summation block comprises a plurality of summing nodes, each summing node including,
a first pair of transistors coupled to the first shift register and coupled to receive a first pair of data bits, the first pair of transistors adapted to convert the first pair of data bits into a first current signal;
a second pair of transistors coupled to the second shift register and coupled to receive a second pair of data bits, the second pair of transistors adapted to convert the second pair of data bits into a second current signal;
a third pair of transistors coupled to the third shift register and coupled to receive the first pair of data bits, the third pair of transistors adapted to convert the first pair of data bits into a third current signal; and
a fourth pair of transistors coupled to the fourth shift register and coupled to receive the second pair of data bits, the fourth pair of transistors adapted to convert the second pair of data bits into a fourth current signal.

11. The DFE of claim 10, wherein a first transistor of the first, second, third, and fourth pair of transistors are coupled together at a first node.

12. The DFE of claim 11, wherein a second transistor of the first, second, third, and fourth pair of transistors are coupled together at a second node.

13. The DFE of claim 12, further comprising a fifth pair of transistors coupled to the first node and coupled to receive a first sign signal, wherein a conductivity state of the fifth pair of transistors is controlled by a first sign signal.

14. The DFE of claim 13, further comprising a sixth pair of transistors coupled to the second node and coupled to receive the first sign signal, wherein a conductivity state of the sixth pair of transistors is controlled by the first sign signal.

15. The DFE of claim 14, further comprising a differential amplifier coupled to receive the currently received data bit and adapted to convert the currently received data bit into a fifth current signal, the differential amplifier including,
    a first load coupled to a first transistor of the fifth and sixth pair of transistors at a third node; and
    a second load coupled to a second transistor of the fifth and sixth pair of transistors at a fourth node.

16. A method of performing decision feedback equalization (DFE), comprising:
    propagating a first portion of input data bits through a first plurality of latches, wherein propagating the first portion of the input data bits comprises clocking the first plurality of latches with first and second clock signals;
    propagating a second portion of the input data bits through a second plurality of latches, wherein propagating the second portion of the input data bits comprises clocking the second plurality of latches with the first and second clock signals;
    resetting a first group of the first and second plurality of latches to a zero state during a time period;
    activating a second group of the first and second plurality of latches during the time period;
    comparing the input data bits to at least one threshold value to determine an output level of the activated latches;
    combining all outputs of the first and second groups of latches during the time period; and
    summing a currently received input data bit with the combined outputs during the time period to equalize the currently received input data bit.

17. The method of claim 16, wherein comparing the input data bits comprises comparing the input data bits to a single threshold value to select between two output levels of the activated latches.

18. The method of claim 16, wherein comparing the input data bits comprises comparing the input data bits to two threshold values to select between three output levels of the activated latches.

* * * * *